(12) United States Patent
Miller et al.

(10) Patent No.: US 8,444,528 B2
(45) Date of Patent: May 21, 2013

(54) METHOD FOR OPERATING A DRIVE TRAIN

(75) Inventors: Martin Miller, Immenstaad (DE);
Mario Steinborn, Friedrichshafen (DE);
Jochen Breuer, Tettnang (DE); Josef Bader, Friedrichshafen (DE); Andreas Graf, Stockach-Wahlwies (DE);
Thomas Hafen, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 377 days.

(21) Appl. No.: 12/773,982

(22) Filed: May 5, 2010

(65) Prior Publication Data

US 2010/0285921 A1 Nov. 11, 2010

(30) Foreign Application Priority Data

May 8, 2009 (DE) .......................... 10 2009 002 921

(51) Int. Cl.
*B60W 10/00* (2006.01)

(52) U.S. Cl.
USPC ........................................................... 477/71

(58) Field of Classification Search
USPC .................. 477/70, 71, 123; 74/339, 745
See application file for complete search history.

(56) References Cited

U.S. PATENT DOCUMENTS

| 5,389,053 | A | * | 2/1995 | Steeby et al. ................. 477/123 |
| 7,632,211 | B2 | * | 12/2009 | Groner et al. ................... 477/71 |
| 2002/0014134 | A1 | * | 2/2002 | Ehrlinger ........................ 74/745 |
| 2006/0166788 | A1 | * | 7/2006 | Buchhold ...................... 477/166 |
| 2009/0107270 | A1 | | 4/2009 | Krieger et al. |

FOREIGN PATENT DOCUMENTS

| DE | 196 52 971 A1 | 6/1998 |
| DE | 100 25 797 A1 | 5/2001 |
| EP | 1 895 201 A2 | 3/2008 |
| WO | WO 2007031191 A1 * | 3/2007 |

* cited by examiner

*Primary Examiner* — Justin Holmes
*Assistant Examiner* — Stacey Fluhart
(74) *Attorney, Agent, or Firm* — David & Bujold, PLLC

(57) ABSTRACT

A method of operating a drivetrain of a motor vehicle. The drivetrain comprises a transmission arranged between a drive assembly and an axle drive, such that an input shaft of the transmission is connected, via a controllable separator clutch, to the drive assembly and an output shaft of the transmission is connected to the axle drive, and such that the transmission comprises at least one shifting element formed as a claw clutch. To reduce the probability that a tooth-on-tooth position may occur in a shifting element formed as a claw clutch, a torque is applied thereto by at least one transmission-internal assembly and/or at least one transmission-external assembly so that a speed difference at the claw clutch approaches a predetermined nominal value, and engagement of the claw clutch is only started when the speed difference of the claw clutch reaches the nominal value.

14 Claims, 2 Drawing Sheets

METHOD FOR OPERATING A DRIVE TRAIN

This application claims priority from German patent application serial no. 10 2009 002 921.4 filed May 8, 2009.

FIELD OF THE INVENTION

The invention concerns a method for operating a drivetrain that comprises at least a drive assembly, a transmission and a drive output.

BACKGROUND OF THE INVENTION

Range-change transmissions with a multi-step main transmission and a range group upstream or downstream from there, and with a splitter group upstream or downstream from the main transmission, have been known for a long time and are preferably used in utility vehicles. By virtue of, for example, a two-step splitter group with a transmission ratio interval that corresponds approximately to half of an average transmission ratio interval between two successive transmission ratio steps of the main transmission, the transmission ratio intervals of the main transmission are halved and the total number of available range-change gears is doubled. With a splitter group, for example with two steps, having a transmission ratio interval that corresponds approximately to half of an average transmission ratio interval between two successive transmission ratio steps of the main transmission, the transmission ratio intervals of the main transmission are halved and the total number of available range-change gears is doubled. And with a range group, for example with two-steps, having a transmission ratio interval above the overall transmission ratio interval of the main transmission by approximately an average transmission ratio interval between two successive transmission ratio steps of the main transmission, the transmission ratio range of the range-change transmission is approximately doubled and the total number of available gears is again doubled.

FIG. 1 shows a diagram of a range-change transmission of the so-termed AS-Tronic family produced by the present applicant. The range-change transmission CT shown in FIG. 1 comprises a main transmission HG, an upstream or splitter group GV in drive connection upstream from the main transmission HG and a range group GP connected downstream from the main transmission HG. The main transmission HG of the range-change transmission CT of FIG. 1 is configured as a direct-gear transmission of countershaft design and has a main shaft WH and two countershafts WVG1, and WVG2, the first countershaft WV1, being provided with a controllable transmission brake Br.

The main transmission HG is of three-step design with three transmission ratio steps G1, G2 and G3 for forward driving and one transmission ratio step R for reverse driving. Respective idler gearwheels of the transmission ratio steps G1, G2 and R are mounted to rotate on the main shaft $W_H$ and can be engaged by means of associated claw clutches. The associated fixed gearwheels are arranged in a rotationally fixed manner on the countershafts $W_{VG1}$, $W_{VG2}$.

The highest transmission ratio step G3 of the main transmission HG, made as a direct gear, can be engaged by means of a direct shifting clutch. The clutches of the transmission ratio steps G3 and G2 and the clutches of the transmission ratio steps G1 and R are in each case in the form of claw clutches and are combined in a common shifting packet, S1 or S2 respectively. The main transmission HG can be shifted without synchronization.

The upstream or splitter group GV of the range-change transmission CT in the sole FIG. 1 is of two-step configuration and also of countershaft design, such that the two transmission ratio steps K1 and K2 of the upstream group GV form two shiftable input constants of the main transmission HG. By virtue of a smaller transmission ratio difference between the two transmission ratio steps K1 and K2, the upstream group GV is designed as a splitter group. The idler gearwheel of the first transmission ratio step K1 is mounted to rotate on the input shaft WGE, which is connected via a controllable separator clutch K to a drive assembly (not shown) in the form of an internal combustion engine.

The idler gearwheel of the second transmission ratio step K2 is mounted to rotate on the main shaft $W_H$. The fixed gearwheels of the two transmission ratios K1, K2 of the splitter group GV are respectively arranged in a rotationally fixed manner on extensions of the countershafts $W_{VG1}$ and $W_{VG2}$ on their input side. The clutches of the splitter group GV, which are synchronized and made as claw clutches, are combined in a common shifting packet SV.

The range group GP of the range-change transmission CT of FIG. 1, connected downstream from the main transmission HG, is also of two-step design but of planetary configuration with a single planetary gearset. The sun gear PS is connected in a rotationally fixed manner to the main shaft WH of the main transmission HG extended on its output side. The planetary carrier PT is coupled in a rotationally fixed manner to the output shaft WGA of the range-change transmission CT. The ring gear PH is connected to a shifting packet SP with two synchronized clutches made as claw clutches, by means of which the range group GP can optionally be shifted to a slow-driving step L by connecting the ring gear PH to a fixed part of the housing, or to a fast-driving step S by connecting the ring gear PH to the main shaft WH or to the sun gear PS. The range group GP can be shifted with synchronization.

From the countershaft $W_{VG2}$ of the range-change transmission CT power can be branched off to drive an auxiliary PTO (Power Take-Off) drive. When power from the range-change transmission CT is to be branched off to drive the PTO auxiliary drive, then the procedure for engaging or switching on the PTO drive is such that first, by action upon the engine, an idling speed of the drive assembly is called for, the range-change transmission is then shifted into neutral and the separator clutch K is disengaged, and then the separator clutch K is engaged again so that when the separator clutch K has been completely engaged, the action upon the engine can stop.

Now, when the clutches of such a range-change transmission CT, made as claw clutches, are engaged, so-termed tooth-on-tooth positions can form in the claw clutches. However, tooth-on-tooth positions in shifting elements in the form of claw clutches impair the shifting comfort and result in increased wear of the shifting elements.

It is therefore important on the one hand to reduce the probability of tooth-on-tooth position occurrence, and on the other hand, should any tooth-against-tooth positions still occur, to release them safely, carefully and in a comfortable manner.

Although the invention is described in the context of a range-change transmission, its application is not intended to be limited to range-change transmissions, but rather, it can be used with transmissions of any type that comprise claw clutches.

From EP 1 895 201 A2 a method for operating a transmission is known, by virtue of which tooth-on-tooth positions in the transmission are released by applying a steady or pulsating braking torque to a transmission shaft by means of the transmission brake. Although with this method tooth-ontooth positions can indeed be removed, the method is not able to reduce the probability of tooth-on-tooth positions occurring.

SUMMARY OF THE INVENTION

Starting from there, the present invention addresses the problem of providing a new type of method for operating a drivetrain of a motor vehicle, with the help of which the probability of tooth-on-tooth positions in shifting elements formed as claw clutches can be reduced. According to the invention, to reduce the probability that tooth-on-tooth positions will occur in a shifting element made as a claw clutch, torque is applied to it by at least one transmission-internal assembly and/or by at least one transmission-external assembly, so that a speed difference at the claw clutch approaches a predetermined value such that engagement of the claw clutch only begins when the speed difference at the claw clutch has reached the predetermined value.

Thanks to the method according to the invention, the probability of tooth-on-tooth positions occurring in shifting elements made as claw clutches is reduced.

Preferably, when the claw clutch is engaged a reduced torque is applied by the, or each transmission-internal assembly and/or by the, or each transmission-external assembly on the claw clutch, which corresponds at least to a friction torque of a tooth-on-tooth position that may be formed when the claw clutch is engaged, and the said torque applied on the claw clutch by the, or each transmission-internal assembly and/or by the, or each transmission-external assembly is only completely removed when the claw clutch has engaged completely.

BRIEF DESCRIPTION OF THE DRAWINGS

Preferred further developments of the invention emerge from the description below. An example embodiment of the invention, to which it is not limited, is described in more detail with reference to the drawing, which shows.

DETAILED DESCRIPTION OF THE PREFERRED EMBODIMENTS

Figure 1:
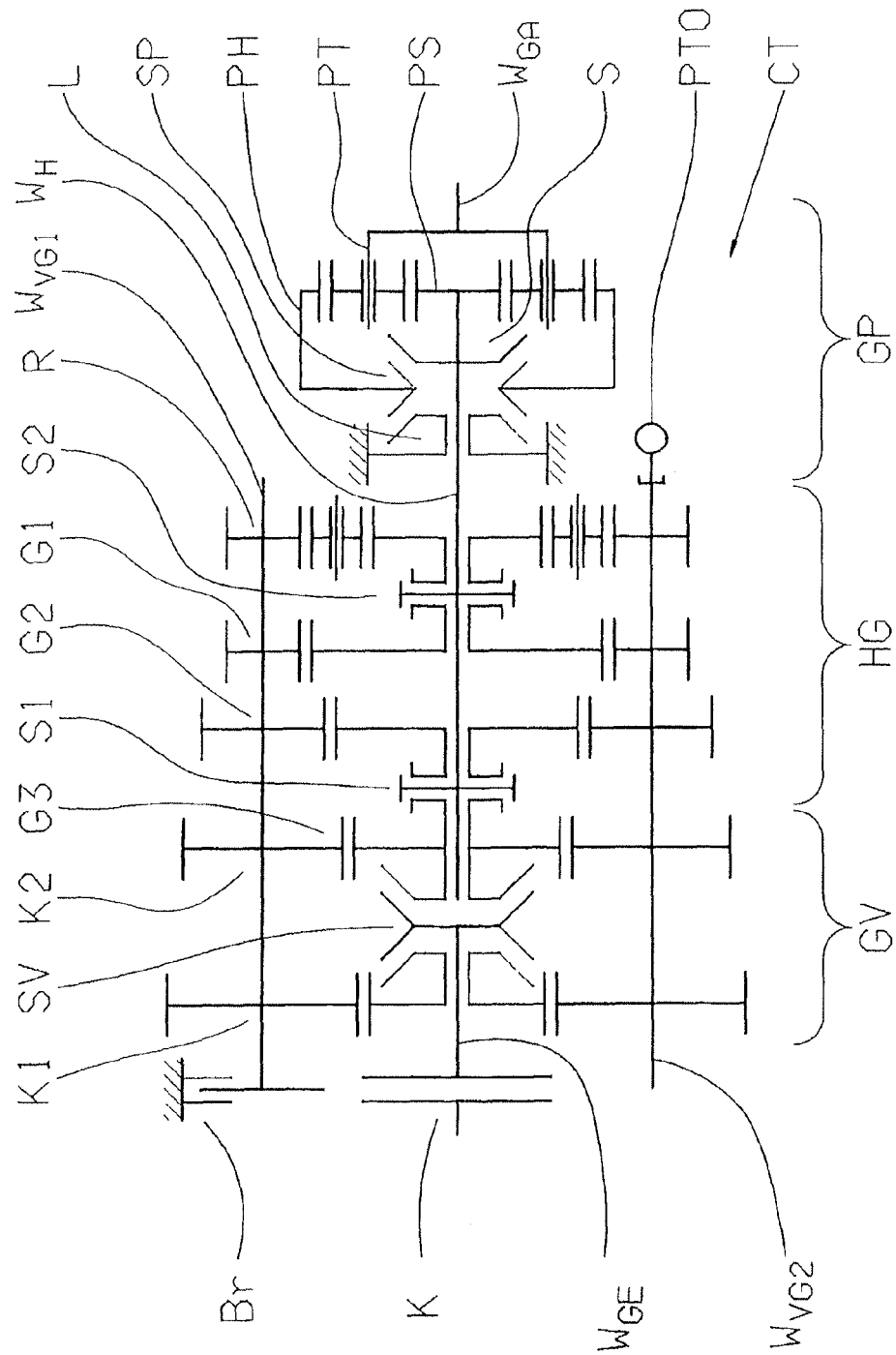
FIG. 1 Diagram of a transmission of a motor vehicle made as a range-change transmission, as known from the prior art.

The present invention concerns a method for operating a drivetrain of a motor vehicle, in particular a drivetrain which, besides a drive assembly, comprises the automated range-change transmission CT shown in FIG. 1 and already described in detail.

However, the invention is not limited to a drivetrain with a range-change transmission, but rather, can also be used in drivetrains with other transmissions which comprise at least one shifting element in the form of a claw clutch.

The present invention relates to such details concerning the operation of a motor vehicle drivetrain, by virtue of which the probability that tooth-on-tooth positions will occur in shifting elements of an automatic or automated transmission formed as claw clutches, can be reduced, and such details by virtue of which, should any tooth-on-tooth positions still occur, they can be released safely, quickly, carefully and very comfortably.

Figure 2:
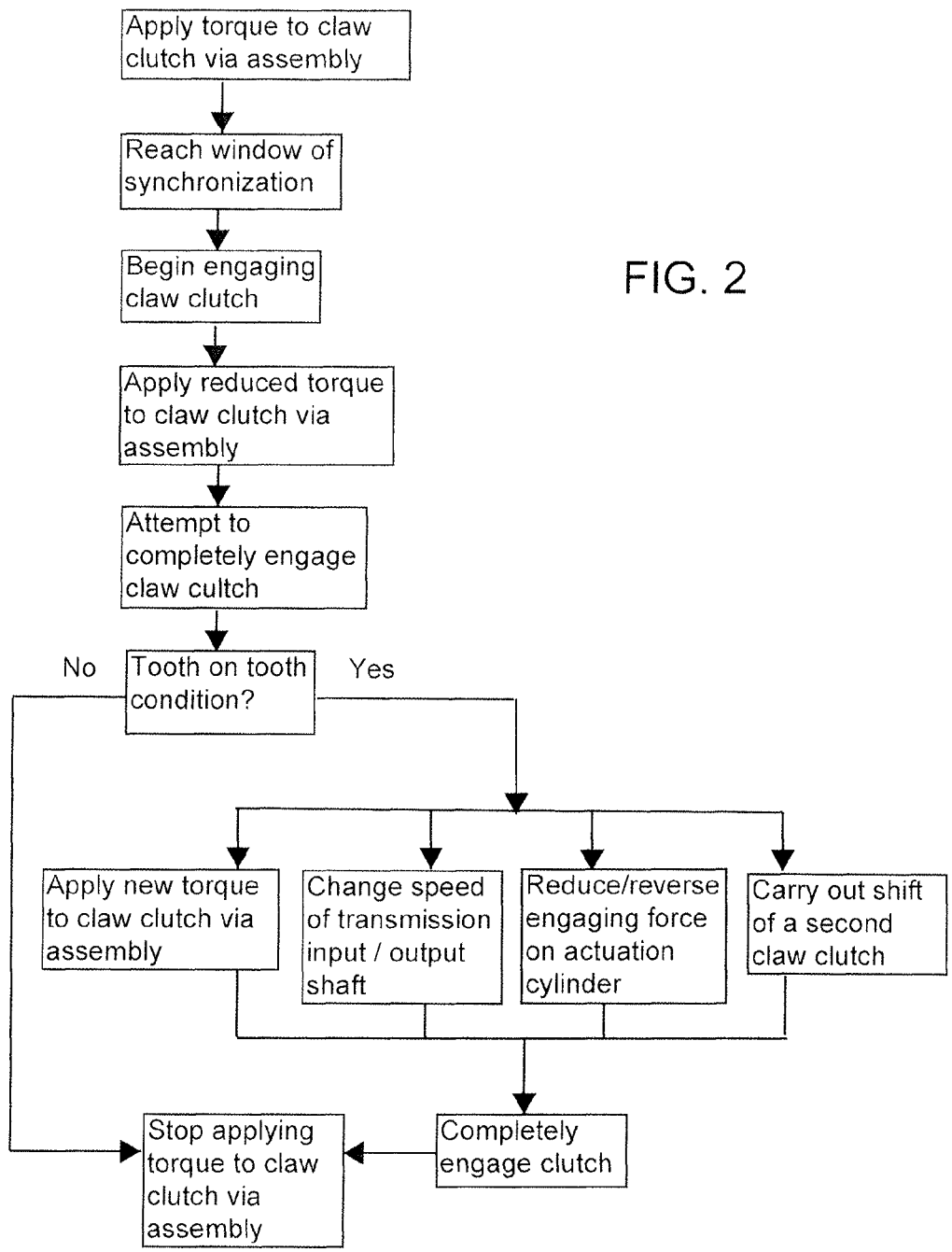
FIG. 2 is a flow chart of the method steps of an embodiment of the present invention.

In the context of the present invention, to reduce the probability that tooth-on-tooth positions will occur in a shifting element made as a claw clutch, for example a shifting element of the shifting packets S1 and S2 of the main transmission HG of the range-change transmission CT shown in FIG. 1, the procedure adopted, as shown generally in FIG. 2, is that a torque is applied by at least one transmission-internal assembly and/or by at least one transmission-external assembly to a shifting element or claw clutch that is to be engaged or closed, namely in such manner that a speed difference at the claw clutch to be engaged approaches a predetermined nominal value and the engaging of the claw clutch only begins when the speed difference at the claw clutch has reached the predetermined nominal value. Thus, only when a defined synchronization window is reached at the claw clutch, does engagement of the claw clutch begin.

When engaging the claw clutch, a reduced torque which can also be called a residual torque is applied to the claw clutch by the, or each transmission-internal assembly and/or by the, or each transmission-external assembly, the torque corresponding at least to a friction torque of a tooth-on-tooth position that may form during engagement of the claw clutch. Thus, the residual torque applied during the engagement of the claw clutch concerned is larger than or equal to the friction torque that may be produced at the claw clutch as the result of a tooth-on-tooth position. The size of this residual torque can be determined by computation, or empirically, or with reference to characteristic curves.

Only when the claw clutch is completely engaged, is the torque applied on the claw clutch by the, or each transmission-internal assembly and/or by the, or each transmission-external assembly removed completely. The engaged position of the claw clutch is detected by measurement with the help of a sensor or, if needs be, deduced from other parameters.

As a transmission-internal assembly with whose help the respective torque is applied to the claw clutch in order to reduce the probability that tooth-against-tooth contacts will occur during the engaging thereof, for example the transmission brake Br, an oil pump, an intarder, an actuation cylinder of the claw clutch and/or of the auxiliary PTO drive can be used. If a transmission-external assembly is used to apply the torque to the claw clutch, the transmission-external assembly used can be, for example, the drive assembly of the drivetrain, a service brake, an engine brake, a pritarder, the separator clutch K and/or a transmission-external auxiliary drive. As already explained, the torque can also be applied to the claw clutch in order to reduce the probability of tooth-on-tooth position occurrence, by a plurality of these assemblies in combination.

The reduction of the probability of tooth-on-tooth position occurrence can be supported by using adapted claw shapes on the claw clutches, for example pointed claws or rounded claws.

If, despite the measures described above which serve to reduce the probability of a tooth-on-tooth position, such a position still occurs in a claw clutch, with the help of the measures below the tooth-on-tooth position can be released quickly, carefully and very comfortably, since by means of at least one transmission-internal assembly and/or at least one transmission-external assembly, the friction torque acting on the claw clutch concerned in the tooth-on-tooth position is changed.

For this, as the transmission-internal assembly, again the brake Br, the oil pump, the intarder, the actuation cylinder of the claw clutch concerned and/or the auxiliary PTO drive can be used. As transmission-external assemblies, again the drive assembly, the service brake, the engine brake, the pritarder, the separator clutch K and/or a transmission-external auxiliary drive can be used.

Thus, the method preferably adopted for releasing a tooth-on-tooth position is, by means of the transmission brake Br in combination with the separator clutch K, to apply to the claw clutch concerned a torque in such manner that the transmission brake Br and the separator clutch K exert opposing torques on the claw clutch, which act on the claw clutch either simultaneously or in succession and which are either continuous or pulsed.

In addition or alternatively, the output speed of the output shaft $W_{GA}$ of the range-change transmission CT can be influenced, for example by means of a transmission-internal intarder and/or a transmission-external service brake of the drivetrain, in order to influence speeds and/or torques at the drive output of the transmission and thereby if necessary to release a tooth-on-tooth position. Particularly preferably, this influencing of the speed of the output shaft $W_{GA}$ of the transmission is used when the transmission CT has an auxiliary PTO drive on the output side, so that by virtue of this output-side auxiliary PTO drive the output speed of the output shaft $W_{GA}$ can be influenced by applying a torque.

Alternatively or in addition, a tooth-on-tooth position can also be released by influencing the drive input speed of the transmission at the input shaft $W_{GE}$ of the transmission CT, this being done by using the drive assembly, an engine brake, a pritarder and/or the separator clutch K.

As already mentioned more than once, torque can also be applied to the claw clutch by an oil pump driven by a transmission shaft of the transmission CT in order to release a tooth-on-tooth position. This can be done, for example, by adapting the speed of the oil pump. As also already mentioned, a torque can also be applied to the claw clutch by a transmission-internal auxiliary PTO drive or a transmission-external auxiliary drive in order to release a tooth-on-tooth position.

All the above measures can be used alone or in combination with one another to release tooth-on-tooth positions in claw clutches of a transmission in a safe, careful and rapid manner.

Alternatively or in addition, a tooth-on-tooth position in a shifting element formed as a claw clutch can also be released by operating an actuation cylinder that serves to control the claw clutch with a changed engaging force. By reducing the engaging force of the actuation cylinder of a claw clutch, a tooth-on-tooth position can be safely and quickly released, and once the tooth-on-tooth position has been released the engaging force is preferably increased again.

In addition or alternatively, the actuation cylinder of the claw clutch concerned can be subjected to a counter-pulse to release the tooth-on-tooth position. Thus, for example when a two-position or three-position cylinder is used as the actuation cylinder, a tooth-on-tooth position can be released by filling an opposite side of the cylinder briefly with a pressure medium in order to produce a counter-pulse which acts in opposition to the actual engaging of the claw clutch. In this way the engaging force of the actuation cylinder can be reduced or completely cancelled, in order to release the tooth-on-tooth position safely, quickly and carefully. If necessary the size of the counter-pulse can be chosen such that the claws of the claw clutch concerned move apart from one another for a short time.

When the method according to the invention is used with a range-change transmission such as the transmission CT shown in FIG. 1, then if a tooth-on-tooth contact occurs, for example in a claw clutch of the shifting packet SV of the splitter group GV, it can be released if, despite the tooth-on-tooth position in the area of the splitter group GV, another shift operation of another shifting element made as a claw clutch, for example in the area of the shifting packet S1, is carried out in a different group of the range-change transmission CT, for example in the main transmission HG.

In such a case, despite the existence of a tooth-on-tooth position in a claw clutch of one group, a shift operation is carried out in another group of the range-change transmission, whereby the speeds and torques at the claw clutch affected by the tooth-on-tooth position are changed, as a result of which, ultimately, the tooth-on-tooth position at the claw clutch concerned can be released.

Furthermore, in range-change transmissions a tooth-on-tooth position in one claw clutch of a group can be released by carrying out a shift operation that involves another claw clutch within the same group.

Indexes

Br Transmission brake
CT Range-change transmission
G1 Transmission ratio step for forward driving
G2 Transmission ratio step for forward driving
G3 Transmission ratio step for forward driving
GV Splitter group
GP Range group
HG Main transmission
K Separator clutch
K1 Transmission ratio step
K2 Transmission ratio step
L Slow-driving stage
PS Sun gear
PT Planetary carrier
PTO Auxiliary drive
PH Ring gear
R Transmission ratio step for reverse driving
S Fast-driving stage
S1 Shifting packet
S2 Shifting packet
SP Shifting packet
SV Shifting packet
$W_{GA}$ Output shaft
$W_{GE}$ Input shaft
$W_H$ Main shaft
$W_{VG1}$ Countershaft
$W_{VG2}$ Countershaft

The invention claimed is:

1. A method for operating a drivetrain of a motor vehicle, the drivetrain comprising a transmission arranged between a drive assembly and an axle drive, such that an input shaft of the transmission being connected, via a controllable separator clutch, to the drive assembly and an output shaft of the transmission being connected to the axle drive, and the transmission comprises at least one shifting element formed as a claw clutch, the method comprising the steps of:

to reduce a probability that a tooth-on-tooth position may occur in a shifting element formed as a claw clutch, an initial torque is applied thereto by at least one of a transmission-internal assembly and a transmission-external assembly, such that a speed difference at the claw clutch approaches a predetermined nominal value, commencing engagement of the claw clutch only when a speed difference of the claw clutch reaches the nominal value; and applying a reduced torque to the claw clutch, during engagement of the claw clutch before a tooth-on-tooth position occurs, by at least one of the transmission-internal assembly and the transmission-external assembly, and the reduced torque being less than the initial torque but at least as great as a friction torque of a tooth-on-tooth position that may form during engagement of the claw clutch.

2. The method according to claim 1, further comprising the step of only completely removing both the initial and the reduced torque applied to the claw clutch, by at least one of the transmission-internal assembly and the transmission-external assembly, once the claw clutch engages.

3. The method according to claim 2, further comprising the step of detecting engagement of the claw clutch with a sensor.

4. The method according to claim 1, further comprising the step of using one of a transmission brake, an oil pump, an intarder, an actuation cylinder and an auxiliary drive output as the transmission-internal assembly for applying one of the initial and the reduced torque to the claw clutch.

5. The method according to claim 1, further comprising the step of using one of the drive aggregate, a service brake, an engine brake, a pritarder, the separator clutch and an auxiliary drive output as the transmission-external assembly for applying one of the initial and the reduced torque to the claw clutch.

6. The method according to claim 1, further comprising the step of changing a level of torque acting at the claw clutch in the tooth-on-tooth position, when a tooth-on-tooth position nevertheless occurs during the engagement of the claw clutch, by at least one of the transmission-internal assembly and the transmission-external assembly to release the tooth-on-tooth position.

7. The method according to claim 6, further comprising the step of using one of a transmission brake, an oil pump, an intarder, an actuation cylinder and an auxiliary drive output as the transmission-internal assembly.

8. The method according to claim 6, further comprising the step of using the drive aggregate, an engine brake, a pritarder, the separator clutch and an auxiliary drive output as the transmission-external assembly.

9. The method according to claim 6, further comprising the step of applying torque to the claw clutch by both the transmission-internal assembly and the transmission-external assembly.

10. The method according to claim 6, further comprising the step of one of reducing, cancelling, and reversing an engaging force from a claw clutch actuation cylinder to aid in releasing the tooth-on-tooth position.

11. The method according to claim 1, further comprising the step of arranging the transmission in the drivetrain such that a range-change transmission comprises at least a multi-step main transmission, with a splitter group connected one of upstream and downstream from the main transmission, a range group connected another of upstream and downstream from the main transmission, and at least one of the main transmission, the splitter group and the range group comprises a claw clutch as a shifting element.

12. The method according to claim 11, further comprising the step of releasing a tooth-on-tooth position in a claw clutch of a group of the range-change transmission by carrying out a shifting operation involving a claw clutch of another group of the range-change transmission.

13. The method according to claim 11, further comprising the step of releasing a tooth-on-tooth position in a claw clutch of a group of the range-change transmission by carrying out a shifting operation involving another claw clutch of the same group of the range-change transmission.

14. The method according to claim 1, further comprising the step of applying torque to the claw clutch by both the transmission-internal assembly and the transmission-external assembly.

* * * * *